2,429,279

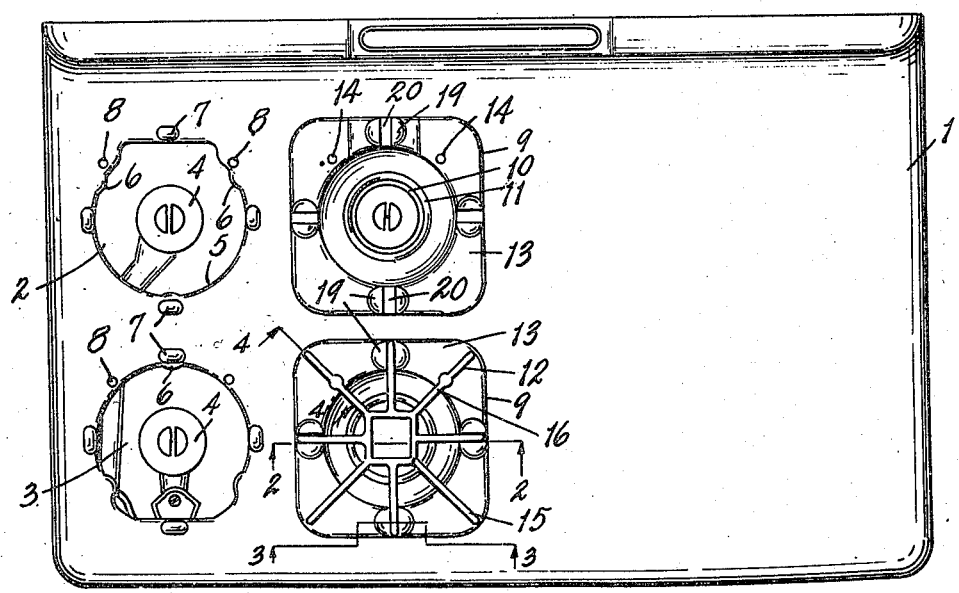
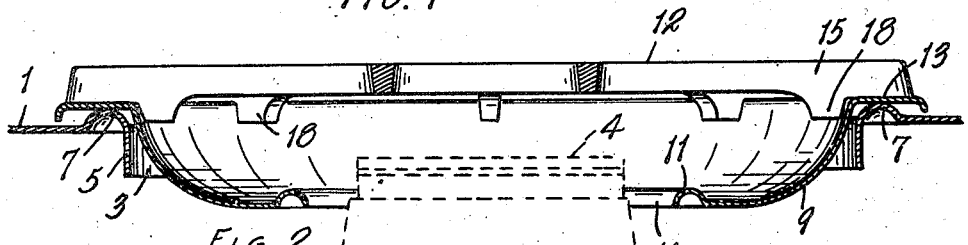
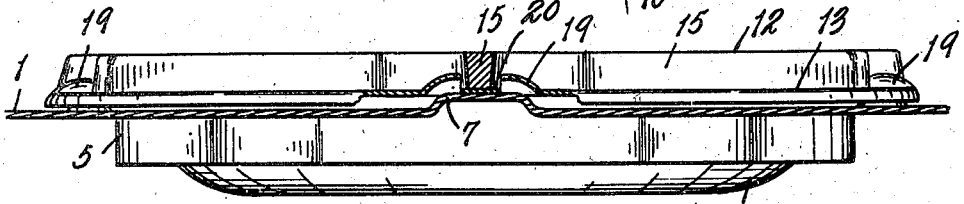
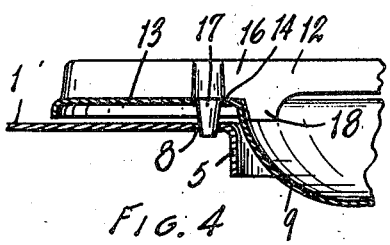

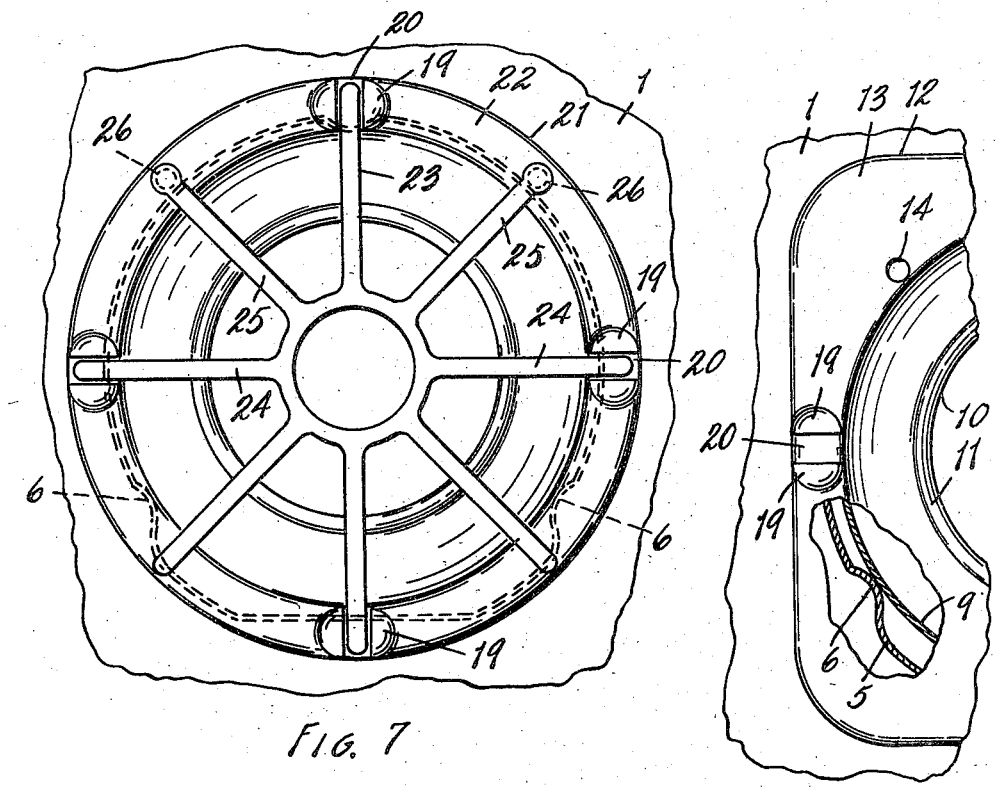
Fig. 7
Fig. 5
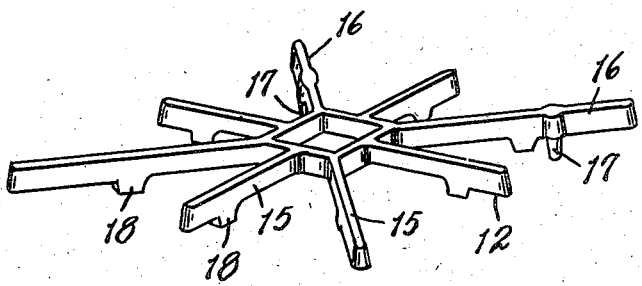
Fig. 6
INVENTORS.
SHIRLY C. SALTER
ROBERT C. LANG
BY JAMES M. COOK
ATTORNEYS Patented Oct. 21, 1947

UNITED STATES PATENT OFFICE 2,429,279

TOP STRUCTURE FOR COOKING STOVES OR RANGES

Shirly C. Salter, Robert C. Lang, and James M. Cook, Kalamazoo, Mich., assignors to Kalamazoo Stove & Furnace Company, Kalamazoo, Mich., a corporation of Michigan Application April 9, 1945, Serial No. 587,358

15 Claims. (Cl. 126—214)

This invention relates to improvements in top structure for cooking stoves or ranges.

The main objects of this invention are:

First, to provide a cooking top for stoves or ranges, particularly the portions thereof directly associated with the burners, which provides an effective support for utensils and for directing the heat of the burner thereto.

Second, to provide a structure having these advantages which is very economical to produce and one in which the edges of the burner opening in the top may be effectively enameled without resorting to individual brushing of the edges thereof; also one in which the top surrounding the burner opening is protected from excessive heat and consequent checking or cracking of the enamel.

Third, to provide a structure in which proper ventilation around the utensil is provided when the grid is removed and the utensil placed upon the aeration bowl and also when both the grid and the aeration bowl are removed and the utensil placed directly on the stove top.

Objects relating to details and economies of the invention will appear from the description to follow. The invention is defined in the claims.

Preferred embodiments of the invention are illustrated in the accompanying drawings, in which:

Fig. 1 is a plan view of a cooking stove top embodying the features of the invention, one of the burner openings being provided with or having a complete assembly of aeration bowl and grid in position, the grid being removed from another burner opening, and both the grid and aeration bowl being removed from the other two burner openings illustrated.

Fig. 2 is an enlarged fragmentary view in section on line 2—2 of Fig. 1, a burner being conventionally illustrated.

Fig. 3 is an enlarged fragmentary side elevation of the parts shown in Fig. 2 partially in section on line 3—3 of Fig. 1.

Fig. 4 is an enlarged fragmentary view partially in section on line 4—4 of Fig. 1.

Fig. 5 is an enlarged fragmentary plan view with the grid removed and with the depending flange of the aeration bowl partially in section.

Fig. 6 is a perspective view of the grid.

Fig. 7 is an enlarged plan view of a modified form or embodiment of the invention.

In the embodiment of the invention illustrated, the top 1 is formed as an integral stamping and is provided with rear burner openings 2 and front burner openings 3. These burner openings are irregular in shape, the rear burner openings having rear enlargements and the front burner openings having front enlargements. Burners 4 indicated conventionally are positioned below the burner openings in proper relation thereto.

The burner openings are provided with depending flanges 5 of substantial width, having bosses 6 projecting inwardly from their lower edges. Upstanding bosses 7 are formed in the top at the edges of the burner openings, these being of substantial height.

The top is provided with holes 8 adjacent the edges of the burner openings and at the outer side of the flanges thereof as is clearly shown in Figs. 1 and 4. With the burner openings provided with the flanges as illustrated, no sharp edges are presented around the burner openings and with these parts integral with the top thus shaped the necessity for hand brushing the enamel to the top is avoided.

The aeration bowl 9 is of generally concavo-convex shape and is of substantial depth having a central opening 10 rimmed by an annular bead 11 formed in the edge of the opening. This bead constitutes a reinforcing means for the bowl and also a retainer for particles that may drop into the bowl. The bowl may be readily cleaned by removing the grid 12.

The aeration bowl is provided with an outturned flange-like rim 13 of a generally square or rectangular outline with rounded corners. This rim overhangs the top around the edges of the burner opening therein and is supported by the bosses 7 in elevated position relative to the top, see Figs. 2, 3 and 4.

The depending flange of the bowl is also supported in spaced relation to the flange 5 of the burner openings by the bosses 6 so that ventilation is provided around the bowl. Holes 14 are provided in the rim 13 of the aeration bowl adapted to be aligned with the holes 8 in the top, see Fig. 4.

The grid 12 is provided with radial arms 15 and 16, the arms 16 having downwardly projecting stud-like lugs 17 engageable through the holes 14 in the rim of the bowl and the registering holes 8, see Fig. 4. This insures an effective location of the parts and prevents their being shifted relative to each other in placing articles on the grid or moving them about on the top of the stove. The arms of the grid are also provided with downwardly projecting lugs 18 which engage within the bowl.

The rim 13 of the bowl has spaced raised portions or bosses 19 thereon forming recesses 20 receiving the arms of the grid and facilitating the positioning of the grid. These raised portions 19 also serve as utensil supports when a utensil is placed directly upon the bowl when the grid has been removed, thus supporting the bottom of the utensil in raised position relative to the rim of the bowl and providing effective ventilation. It is of course desirable and intended that the entire assembly will be continuously used but in the event of removal of the grid, effective ventilation is still provided and in the event of the removal of both the grid and the aeration bowl the utensil is supported by the raised portion 7 on the top and effective ventilation provided. This is important in gas burners, not only in utilizing the heat units but as a safety factor.

In the embodiment of the invention shown in Fig. 7, the burner opening is round as distinguished from having the irregular shape shown in Fig. 1 and the aeration bowl 21 is also round, having a circular rim 22. The grid 23 is provided with radial arms 24 and 25, the arms 25 being provided with the downwardly projecting lugs 26 engaging holes in the aeration bowl and in the stove top substantially as in the embodiment shown in Fig. 4. The structure varies from that described only in the shape of the burner opening and corresponding variation in the shape of the aeration bowl and grid.

We have illustrated and described our improvements in practical commercial embodiments thereof. We have not attempted to illustrate and describe certain other embodiments or adaptations which we contemplate as we believe this disclosure will enable those skilled in the art to embody or adapt our invention as may be desired.

Having thus described our invention, what we claim as new and desire to secure by Letters Patent, is:

1. In a cooking stove or range, the combination of a cooking top having a burner opening therein surrounded by a downwardly projecting flange, the flange having angularly spaced bosses projecting inwardly therefrom, said top having upstanding bosses and holes adjacent its burner opening, an aeration bowl having an out-turned flange-like rim at the top thereof overhanging the top at the edges of its said burner opening and supported by said upstanding bosses in spaced relation to the surface of the top, the wall of the bowl being spaced from the burner opening flange by the said bosses thereon, said aeration bowl having holes in the rim thereof aligned with said holes in said top and having upstanding bosses disposed in spaced pairs, said aeration bowl depending through said opening in said top and having a central opening surrounded by an annular bead-like portion providing a trough at the bottom of said bowl, and a grid member comprising radiating arms resting on the rim of said bowl, certain of said arms being disposed between said pairs of bosses, the arms being provided with downwardly projecting lugs engaging with the bowl and certain of said arms having lugs engageable through said registering holes in said bowl rim and top.

2. In a cooking stove or range, the combination of a cooking top having a burner opening therein surrounded by a downwardly projecting flange, the flange having angularly spaced bosses projecting inwardly therefrom, said top having upstanding bosses adjacent its burner opening, an aeration bowl having an out-turned flange-like rim at the top thereof overhanging the top at the edges of its said burner opening and supported by said upstanding bosses in spaced relation to the surface of the top, the wall of the bowl being spaced from the burner opening flange by the said bosses thereon, said aeration bowl having upstanding bosses disposed in spaced pairs, said aeration bowl depending through said opening in said top and having a central opening surrounded by an annular bead-like portion providing a trough at the bottom of said bowl, and a grid member comprising radiating arms resting on the rim of said bowl, certain of said arms being disposed between said pairs of bosses, the arms being provided with downwardly projecting lugs engaging with the bowl.

3. In a cooking stove or range, the combination of a cooking top having a burner opening therein surrounded by a downwardly projecting flange, the flange having angularly spaced bosses projecting inwardly therefrom, said top having upstanding bosses and holes adjacent its burner opening, an aeration bowl having an out-turned flange-like rim at the top thereof overhanging the top at the edges of its said burner opening and supported by said upstanding bosses in spaced relation to the surface of the top, the wall of the bowl being spaced from the burner opening flange by the said bosses thereon, said aeration bowl having holes in the rim thereof aligned with said holes in said top and having upstanding bosses, stud-like members received by said aligned openings for holding the bowl in a predetermined position relative to the cooking top, said aeration bowl depending through said opening in said top, and a grid member resting on the rim of said bowl.

4. In a cooking stove or range, the combination of a cooking top having a burner opening therein surrounded by a downwardly projecting flange, the flange having angularly spaced bosses projecting inwardly therefrom, said top having upstanding bosses adjacent its burner opening, an aeration bowl having an out-turned flange-like rim at the top thereof overhanging the top at the edges of its said burner opening and supported by said upstanding bosses in spaced relation to the surface of the top, the wall of the bowl being spaced from the burner opening flange by the said bosses thereon, said aeration bowl having upstanding bosses, said aeration bowl depending through said opening in said top, and a grid member resting on the rim of said bowl.

5. In a cooking stove or range, the combination of a cooking top having a burner opening therein surrounded by a downwardly projecting flange, said top having spaced upstanding bosses at the edge of the opening, an aeration bowl having an outwardly turned flange-like rim at the top thereof overhanging the top at the edges of its said burner opening and supported by said bosses in spaced relation to the surface of the top and with the wall of the bowl in spaced relation to the said down-turned flange of the burner opening, the rim of said bowl being conformed to provide radial recesses, and a grid member comprising radiating arms resting on said rim of said aeration bowl and provided with positioning lugs engaging said bowl, certain of its arms being positioned in said recesses in said bowl rim.

6. In a cooking stove or range, the combination of a cooking top having a burner opening therein surrounded by a downwardly projecting flange provided with spaced inwardly projecting bosses, said top having spaced upstanding bosses and holes at the edges of its said burner opening, an aeration bowl having an outwardly turned flange-like rim at the top thereof overhanging the top at the edges of its said burner opening and supported by said upstanding bosses in spaced relation to the upper surface of the top and with the vertical portion of the wall of the bowl held in laterally spaced relation to the said downturned flange of the burner opening by said inwardly projecting bosses thereon, said aeration bowl depending through said opening and having a central opening surrounded by an upstanding annular bead-like portion, the rim of said bowl having holes registering with the holes of said top, and a grid member comprising radiating arms resting on said rim of said aeration bowl and provided with positioning lugs engaging said bowl, certain of said lugs projecting into said registering holes in said top.

7. In a cooking stove or range, the combination of a cooking top having a burner opening therein surrounded by a downwardly projecting flange, said top having spaced holes and spaced upstanding bosses adjacent its said burner opening, an aeration bowl having an outwardly turned flange-like rim at the top thereof overhanging the top at the edges of its said burner opening and supported by said bosses in spaced relation to the surface of the top and with the wall of the bowl in spaced relation to the said downturned flange of the burner opening, the rim of said bowl having holes registering with the holes in said top, and a grid member comprising radiating arms resting on said rim of said aeration bowl and provided with positioning lugs engaging said bowl and with lugs projecting into said registering holes.

8. In a structure of the class described, the combination of a cooking top having a burner opening therein surrounded by a downwardly projecting flange having spaced inwardly projecting bosses, said top having upstanding bosses adjacent the burner opening, an aeration bowl having an outwardly projecting rim-like flange at the top thereof overhanging the top at the edges of the burner opening and supported by said upstanding bosses in spaced relation to the surface of the top and with the wall of the bowl in laterally supported engagement with the bosses on said down-turned flange of the burner opening, said aeration bowl depending through said opening and having a central opening therein, the rim of the bowl being conformed to provide spaced raised portions, and a grid member resting on said rim of said bowl and provided with positioning portions engaging between said spaced raised portions, said raised portions on said rim being adapted to support an article placed on the aeration bowl in the absence of the grid member with the bottom of the article in spaced relation to the rim except at said raised portions thereof.

9. In a structure of the class described, the combination of a cooking top having a burner opening therein surrounded by a downwardly projecting flange, said top having upstanding spaced portions at the edges of said opening, and an aeration bowl having an outwardly projecting rim-like flange at the top thereof overhanging the top at the edges of the burner opening and supported by said upstanding portions in spaced relation to the top and with the wall of the bowl in spaced relation to said downturned flange of the burner opening, the rim of the bowl being adapted to support a grid and conformed to provide spaced raised portions adapted to support an article placed on the aeration bowl in the absence of a grid with the bottom of the article in spaced relation to the rim except at said raised portions thereof.

10. In a structure of the class described, the combination of a cooking top having a burner opening therein and spaced upset portions and holes at the edge of said opening, an aeration bowl having an out-turned rim overhanging the top at the edges of its said burner opening and supported by said upset portions in spaced relation to the upper surface of the top, the rim of said bowl having spaced raised portions and holes registering with the holes of said top, and a grid member comprising radiating arms resting on said rim of said aeration bowl, certain of said arms being provided with lugs projecting into the registering holes of said bowl and top, said raised portions on said bowl rim being adapted to support an object placed thereon in the absence of the grid in spaced relation to the rim of the aeration bowl, said upset portions of said top being adapted to support an object placed thereon in the absence of the aeration bowl and to provide ventilating openings beneath the object.

11. In a structure of the class described, the combination of a cooking top having a burner opening therein and spaced upset portions at the edge of said opening, an aeration bowl having an out-turned rim overhanging the top at the edges of its said burner opening and supported by said upset portions in spaced relation to the upper surface of the top, the rim of said bowl having spaced raised portions, and a grid member comprising radiating arms resting on said rim of said aeration bowl and provided with positioning lugs engaging within said bowl, said raised portions being adapted to support an object placed thereon in the absence of the grid in spaced relation to the rim of the aeration bowl and to provide ventilating openings beneath the object.

12. In a structure of the class described, the combination of a cooking top having a burner opening therein and spaced upset portions at the edge of said opening, an aeration bowl having an out-turned rim overhanging the top at the edges of its said burner opening and supported by said upset portions in spaced relation to the upper surface of the top, and a grid member comprising radiating arms resting on said rim of said aeration bowl and provided with positioning lugs engaging within said bowl, said upset portions being adapted to support an object placed thereon in the absence of the grid and aeration bowl and to provide ventilating openings beneath the object.

13. In a structure of the class described, the combination of a cooking top having a burner opening therein and upstanding spaced bosses at the edge of said opening, said top also having holes adjacent the edge of the opening, an aeration bowl having an out-turned rim overhanging the top at the edges of its said burner opening and supported by said bosses in spaced relation to the upper surface of the top, the rim of said bowl having holes registering with the holes of said top, and a grid member resting on said rim of said aeration bowl and provided with lugs projecting into the registering holes of said bowl and top.

14. In a structure of the class described, the combination of a cooking top having a burner opening therein and upstanding spaced bosses at the edge of said opening, an aeration bowl having an out-turned rim overhanging the top at the edges of its said burner opening and supported by said bosses in spaced relation to the upper surface of the top, the rim of said bowl having spaced raised portions and being adapted to support a grid, said raised portions being adapted to support an object placed thereon in the absence of a grid in spaced relation to the rim of the aeration bowl and to provide ventilating openings beneath the object.

15. In a structure of the class described, the combination of a cooking top having a burner opening therein and upstanding spaced bosses at the edge of said opening, and an aeration bowl having an out-turned rim overhanging the top at the edges of its said burner opening and supported by said bosses in spaced relation to the upper surface of the top, the rim of said bowl being adapted to support a grid, said bosses being adapted to support an object placed thereon in the absence of a grid and the aeration bowl and to provide ventilating openings beneath the object.

SHIRLY C. SALTER.
ROBERT C. LANG.
JAMES M. COOK.

REFERENCES CITED

The following references are of record in the file of this patent:

UNITED STATES PATENTS

| Number | Name | Date |
|---|---|---|
| 670,740 | Sheppard | Mar. 26, 1901 |
| 1,168,875 | Franz | Jan. 18, 1916 |
| 2,043,382 | Leonard | June 9, 1936 |
| 2,180,645 | Sherman | Nov. 21, 1939 |
| 2,185,275 | Sherman | Jan. 2, 1940 |
| 2,223,961 | Mills | Dec. 3, 1940 |
| 1,991,503 | Hobson | Feb. 19, 1935 |

FOREIGN PATENTS

| Number | Country | Date |
|---|---|---|
| 82,572 | Switzerland | Oct. 1, 1919 |
| 446,121 | Great Britain | Apr. 24, 1936 |